(12) United States Patent
Gilkerson et al.

(10) Patent No.: US 8,788,887 B2
(45) Date of Patent: Jul. 22, 2014

(54) DATA PROCESSING APPARATUS, TRACE UNIT AND DIAGNOSTIC APPARATUS

(75) Inventors: Paul Anthony Gilkerson, Newmarket (GB); John Michael Horley, Hauxton (GB)

(73) Assignee: ARM Limited, Cambridge (GB)

( * ) Notice: Subject to any disclaimer, the term of this patent is extended or adjusted under 35 U.S.C. 154(b) by 317 days.

(21) Appl. No.: 13/137,273

(22) Filed: Aug. 3, 2011

(65) Prior Publication Data

US 2012/0066552 A1     Mar. 15, 2012

(30) Foreign Application Priority Data

Sep. 13, 2010 (GB) .................................. 1015181.9

(51) Int. Cl.
    *G06F 11/00*      (2006.01)
(52) U.S. Cl.
    USPC .......................................................... 714/45
(58) Field of Classification Search
    CPC    G06F 11/348; G06F 11/3466; G06F 11/3471
    USPC .......................................................... 714/45
    See application file for complete search history.

(56) References Cited

U.S. PATENT DOCUMENTS

| | | |
|---|---|---|
| 2001/0054175 A1 | 12/2001 | Watanabe |
| 2003/0051122 A1 | 3/2003 | Sato |
| 2004/0103349 A1* | 5/2004 | Nardini et al. .................. 714/39 |
| 2008/0288741 A1* | 11/2008 | Lee et al. ....................... 711/200 |

FOREIGN PATENT DOCUMENTS

| | | |
|---|---|---|
| EP | 1 349 074 | 10/2003 |
| EP | 1 443 401 | 8/2004 |
| JP | 2001-282575 | 10/2001 |
| JP | 2003-280941 | 10/2003 |
| JP | 2004-178591 | 6/2004 |
| JP | 2006-268746 | 10/2006 |
| JP | 2009-42815 | 2/2009 |

OTHER PUBLICATIONS

Park et al., "Address Compression Through Base Register Caching", *IEEE*, No Date, pp. 193-199.
M. Burtscher, "VPC3: A Fast and Effective Trace-Compression Algorithm", *Sigmetrics/Performance '04*, Jun. 2004, pp. 167-176.
The Nexus 5001 Forum, "Standard for a Global Embedded Processor Debug Interface", *IEEE-ISTO*, Dec. 2003, 157 pgs.

(Continued)

*Primary Examiner* — Philip Guyton
(74) *Attorney, Agent, or Firm* — Nixon & Vanderhye P.C.

(57) ABSTRACT

A trace circuit 8 is configured to generate a stream of trace data elements indicative of processing operations performed by a processing circuit 4. The trace circuit 8 has a plurality of reference address registers 30-1 configured to store corresponding reference addresses. When the processing circuit 4 performs a processing operation associated with an associated memory address, the trace circuit 8 selects one of the reference address registers 30-1 as a selected reference address register, and generates a trace data element indicating: (i) which of the reference address registers 30-1 is the selected reference address register, and (ii) a difference, if any, between the associated memory address and the reference address of the selected reference address register. A diagnostic apparatus 20 for analyzing the trace stream has a similar set of reference address registers 30-2 which are used to reconstruct the associated memory address from the generated trace data element.

48 Claims, 10 Drawing Sheets

(56) References Cited

OTHER PUBLICATIONS

MIPS PDTrace Specification, *MIPS Technologies*, Nov. 2010, 154 pgs.

Embedded Trace Macrocell, Architecture Specification, *Arm Limited*, 2007.

Japanese Office Action mailed May 7, 2014 in JP 2011-195900 and English translation.

* cited by examiner

Associated address: 0x00004012

Candidates: (portion different to reference address)

| 0 | 0x00000000 |
|---|---|
| 1 | 0x00004003 |
| 2 | 0x01000417 |
| 3 | 0xB0000020 |

0x4012
0x12  ← most efficient
0x0004012
0x00004012 trace data element: <address header 1> 0x12
                           ↑         ↑
                           40       42

FIG. 2

Associated address: 0x00004012

Candidates: (associated address − reference address)

| 0 | 0x00000000 |
|---|---|
| 1 | 0x00004003 |
| 2 | 0x01000417 |
| 3 | 0xB0000020 |

0x4012
0xF  ← most efficient
0xFF003BFB
0x50003FF2 trace data element: <address header 1> 0xF
                           ↑         ↑
                           40       42

FIG. 3

Associated address = 0x00001000

Reference address 2 = 0x00001000

A) <address header 2> 0x0

B) <address header 2> <code indicating exact match>

C) <address header 2>

D) <address header 2 modified to indicate> exact match

FIG. 4

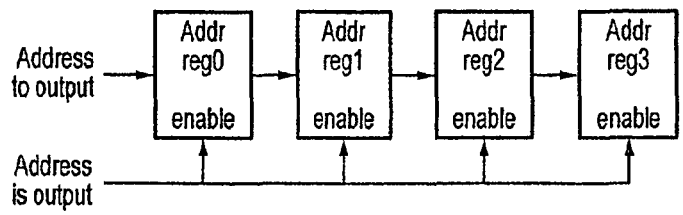
FIG. 7
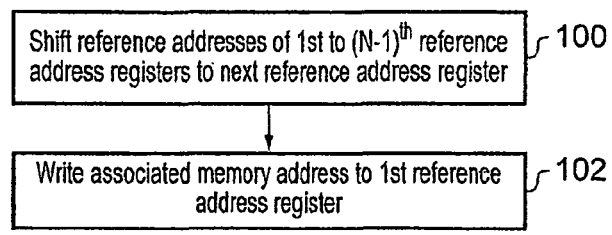
FIG. 8
| | Associated address to be output | Address register 0 | Address register 1 | Address register used | Trace bytes output |
|---|---|---|---|---|---|
| 1 | 0x00000001 | 0x00000000 | 0x00000000 | 0 | <address header0> 0x01 |
| 2 | 0x00000021 | 0x00000001 | 0x00000000 | 0 | <address header0> 0x21 |
| 3 | 0x30000000 | 0x00000021 | 0x00000001 | 0 | <address header0> 0x30 0x00 0x00 0x00 |
| 4 | 0x00000109 | 0x30000000 | 0x00000021 | 1 | <address header1> 0x01 0x09 |
| 5 | 0x30000004 | 0x00000109 | 0x30000000 | 1 | <address header1> 0x04 |
| 6 | 0x30000008 | 0x30000004 | 0x00000109 | 0 | <address header0> 0x08 |
FIG. 9

| | Associated address to be output | Address register 0 | Address register 1 | Address register used | Trace bytes output |
|---|---|---|---|---|---|
| 1 | 0x00000001 | 0x00000000 | 0x00000000 | 0 (no shift) | <address header0> 0x01 |
| 2 | 0x00000021 | 0x00000001 | 0x00000000 | 0 (no shift) | <address header0> 0x21 |
| 3 | 0x30000000 | 0x00000021 | 0x00000000 | 0 (shift) | <address header0> 0x30 0x00 0x00 0x00 |
| 4 | 0x00000109 | 0x30000000 | 0x00000021 | 1 | <address header1> 0x01 0x09 |
| 5 | 0x30000004 | 0x00000109 | 0x30000000 | 1 | <address header1> 0x04 |
| 6 | 0x30000008 | 0x30000004 | 0x00000109 | 0 (no shift) | <address header0> 0x08 |

DATA PROCESSING APPARATUS, TRACE UNIT AND DIAGNOSTIC APPARATUS

This application claims priority to GB Application No. 1015181.9 filed 13 Sep. 2010, the entire contents of which are incorporated herein by reference.

BACKGROUND OF THE INVENTION

1. Field of the Invention

The present invention relates to the field of data processing. More particularly, the invention relates to generation and analysis of trace data indicative of processing operations performed by a processing apparatus.

2. Description of the Prior Art

In a data processing system, a trace circuit may be provided for monitoring processing operations performed by a processing circuit and generating trace data indicating characteristics of the processing operations. The generated trace data can then be analysed by a diagnostic apparatus to determine a processing outcome of the processing operations. The information derived from the trace data may be useful for diagnostic or debugging purposes, for example.

Sometimes, the processing circuit may perform a processing operation in association with a memory address. In such cases, it can be useful for the trace circuit to include in the trace data stream an indication of the memory address. For example, instruction addresses, branch target addresses, or load/store addresses may be traced. Some-trace circuits maintain an address register for storing a reference address. When an address is required to be output in the trace stream, then the trace circuit can omit higher order bits of the address if they are the same as corresponding bits of the reference address stored in the address register. By omitting bits of the address that are the same as the corresponding reference bits, the amount of trace data is reduced.

Another kind of trace unit may have address registers that are used for specific types of instructions, for example, one address register used only for instruction addresses of currently executed instructions and another address register used only for load/store addresses used by load/store instructions. However, for any particular type of instruction, the trace unit always uses the same address register.

The present technique seeks to provide a trace unit which can provide greater compression of addresses in the trace data stream.

SUMMARY OF THE INVENTION

Viewed from one aspect, the present invention provides a data processing apparatus comprising:

a memory comprising a plurality of memory locations identified by corresponding memory addresses;

processing circuitry configured to perform processing operations in response to instructions; and trace circuitry configured to generate a stream of trace data elements indicative of said processing operations performed by said processing circuitry and to output said stream of trace data elements; wherein:

said trace circuitry comprises a plurality of reference address registers configured to store a plurality of reference addresses; and said trace circuitry is responsive to said processing circuitry processing an instruction for performing a processing operation associated with an associated memory address to select one of said plurality of reference address registers as a selected reference address register and to generate and output a trace data element indicating:

(i) first information indicative of which of said plurality of reference address registers is said selected reference address register; and (ii) second information indicative of a difference between said associated memory address and a selected reference address stored in said selected reference address register.

The present technique provides a data processing apparatus having processing circuitry for performing processing operations and trace circuitry for generating and outputting a stream of trace data elements indicative of the processing operations performed by the processing circuitry. The trace circuitry has a plurality of reference address registers configured to store a plurality of reference addresses. When the processing circuitry processes an instruction for performing a processing operation associated with an associated memory address, the trace circuitry selects any one of the plurality of reference address registers as a selected reference address register, and generates and outputs a trace data element indicating first information indicating which of the plurality of reference address registers is the selected address register and second information indicating a difference between the associated memory address and the selected reference address of the selected reference address register.

The smaller the difference between the associated memory address and the selected reference address, the smaller the amount of trace data required to represent the associated memory address. By allowing the trace circuitry to select any of the plurality of address registers for a given associated memory address, and generating a trace data element in which the selected reference address register is identified and a difference between the selected reference address and the associated memory address is indicated, there is an increased likelihood that one of the reference addresses in the plurality of reference address registers matches the associated memory address, or differs from the associated memory address by a small amount. Hence, the probability of the trace data being compressed to a greater extent is increased, and therefore the probability of a trace buffer for storing the trace data overflowing, or the generated trace data exceeding the available trace bandwidth, is reduced.

Note that, if the associated memory address matches the selected reference address exactly, then the second information is indicative of a zero difference between the associated memory address and selected reference address.

The trace data element may encode the first information and second information in a number of ways. It is possible to provide the trace data element including a single data value which identifies both which reference address register is the selected reference address register and the difference between the associated memory address and the selected reference address.

However, in an embodiment the trace data element may comprise a header portion indicating the first information indicative of the selected reference address register, and an address portion indicating the second information indicative of the address difference between the associated memory address and selected reference address.

The case where the associated memory address matches the selected reference address exactly may be encoded in the trace data element in a number of ways. For example, the address portion of the trace data element may be set to a zero value indicating a zero difference between the associated memory address and the selected reference address. Alternatively, a predetermined identifier could be included in the trace data element signifying that there was an exact match between the associated memory address and the selected reference address.

However, in one embodiment the trace circuitry may omit the address portion from the trace data element if the difference between the associated address and the selected reference address is zero. In this case, a trace data element comprising only a header portion, but no address portion, can indicate that there was an exact match between the selected reference address and the associated memory address (i.e. the absence of an address portion conveys second information indicating that there is no difference between the associated memory address and the selected reference address). By omitting the address portion when there is an exact match between the associated memory address and selected reference address, the amount of trace data can be reduced.

The trace circuitry may be configured to select the selected reference address register in a number of ways. In one embodiment, the trace circuitry may be configured to determine a plurality of candidate second information values corresponding to the respective plurality of reference address registers. Each candidate second information value indicates a difference between the associated memory address and the reference address stored in the reference address register corresponding to that candidate second information value. The trace circuitry may select as the selected reference address register the reference address register corresponding to a most efficient candidate second information value. The most efficient candidate second information value will typically be the value which results in the most efficient encoding of the trace data element. If multiple candidate second information values are equally efficient, then any one of these values may be selected as the most efficient candidate second information value. The trace circuitry may then generate the trace data element indicating second information corresponding to the most efficient candidate second information value. By selecting as the selected reference address register the reference address register corresponding to the most efficient candidate value, the trace data can be encoded more efficiently.

In one embodiment, the most efficient candidate second information value is included in the trace data element to provide the corresponding second information. However, in other embodiments the most efficient candidate second information value need not always be included in the trace data element and sometimes another kind of information may be included in the trace data element to indicate the corresponding second information. For example, when there is an exact match between the associated memory address and the selected reference address then the most efficient candidate second information will indicate a zero difference and so the corresponding second information may be represented in the trace data element using zero bits, with the absence of the address information indicating an exact match in the way described above.

In one example, the most efficient candidate second information value is the candidate second information value for which the corresponding second information is representable using the smallest number of bits. By including in the trace data element the second information which can be represented using the fewest bits, the amount of trace data can be reduced.

Alternatively, the most efficient candidate second information value may be selected as the candidate second information value for which the corresponding second information, if included in the trace data element within the stream of trace data elements, would result in the smallest total amount of trace data within the stream of trace data elements. Hence, by selecting an appropriate one of the reference address registers as the selected reference address register, the total amount of trace data can be reduced.

The second information may indicate the difference between the associated memory address and the selected reference address in different ways. In one embodiment, the second information may indicate a portion of the associated memory address having different bit values to a corresponding portion of the selected reference address of the selected reference address register. By providing second information indicating the portion having different bits to corresponding bits of the selected reference address, and omitting a common portion that is the same in the associated memory address and the selected reference address, the second information can be represented using fewer bits than the associated memory address.

Alternatively, the second information may indicate a numerical difference between the associated memory address and the selected memory address. In this case, the trace circuitry may generate the second information by subtracting the associated memory address from the selected reference address, or vice versa, to generate the numerical difference.

It is possible to provide reference address registers which store fixed reference addresses which do not change during the tracing operation. However, in an embodiment the trace circuitry may be configured, after generating the trace data element, to perform a reference address updating operation for selectively updating the reference address of at least one of the plurality of reference address registers in dependence on the associated memory address.

The present technique recognises that there is a significant likelihood that an associated memory address for one processing operation is similar to an associated memory address for one or more following processing operations. For example, a loop of program instructions may branch to the same destination address a number of times, or a series of load/store operations may be performed on a block of neighbouring memory addresses. Hence, by providing the trace circuitry with the ability to update the reference address of at least one of the reference address registers in dependence on the associated memory address, the probability of the associated memory address for a following processing operation being the same as, or similar to, one of the reference addresses is increased, and so it is likely that the total amount of trace data can be reduced.

In one embodiment, the reference address updating operation comprises writing the associated address to a victim reference address register selected from the plurality of reference address registers. The associated memory address then becomes one of the reference addresses which can be used on a following operation to generate a trace data element. By updating one of the reference addresses using the associated memory address, it is more likely that a difference between an associated memory address for a following processing operation and one of the reference addresses is small.

It is not necessary for the trace circuitry to update the reference address registers after every processing operation or after every trace data element is generated. Sometimes the trace circuitry may not update any of the reference addresses. For example, in one embodiment the reference address updating operation comprises:

(a) determining for at least one reference address register whether or not an address difference between the corresponding reference address and said associated memory address exceeds a predetermined threshold; and (b) if said address difference exceeds said predetermined threshold for each of said at least one reference address register, then writing said associated memory address to a victim reference address register selected from said at least one reference address register.

It may be desirable for the reference address registers to store a wide spread of different reference addresses in different ranges of the memory address space, because this would increase the likelihood of any given associated memory address differing from one of the reference addresses by a small amount. To prevent too many similar reference address values being stored in the reference address registers, the trace circuitry may determine, for at least one of the reference address registers, whether or not an address difference between the associated memory address and the corresponding reference address exceeds a predetermined threshold. The trace circuitry may then write the associated memory address to a victim reference address register if the address difference exceeds the predetermined threshold. If the address difference does not exceed the threshold then this indicates that one of the reference addresses already stored in the reference address registers is substantially as useful for compressing the trace data as the associated reference address would be if it were stored to the reference address registers, and so in this case there is little advantage associated with updating the reference address registers with the associated memory address. Hence, in this case the trace circuitry can select not to update the reference address registers with the associated memory address.

The threshold address difference for determining whether or not to update the reference address registers with a given associated memory address may be defined in different ways. For example, the predetermined threshold may be a threshold number of bits for the portion of the associated memory address that is different to the corresponding portion of the reference address. For example, if a threshold number of bits is four bits, then the trace circuit could update one of the reference addresses with the associated memory address if the associated memory address differs from one of the existing reference addresses by more than four bits. Alternatively, the threshold address difference may be defined as a numerical difference such that associated memory address is stored to one of the reference address registers if the numerical difference between the associated memory address and an existing reference address is greater than the threshold.

In one embodiment, the predetermined threshold corresponds to a minimum size of the address portion for indicating the second information. In some trace encoding schemes, the address portion for indicating the second information may have a minimum size. If the difference between the associated memory address and one of the existing reference addresses does not exceed the predetermined threshold (i.e. the difference can already be represented using an address portion of the minimum size), then using the associated memory address as a reference address would not reduce the amount of trace data by any more than can already be achieved using the existing reference address, and so there would be little advantage in writing the associated memory address to the reference address registers. In the case where the predetermined threshold is a threshold number of bits of the portion that changes between the associated memory address and reference address, then the threshold may correspond to the number of bits in the minimum size of address portion. Alternatively, where the predetermined threshold is a numerical difference, this could correspond to the maximum positive or negative value that can be represented using the minimum size of address portion. For example, if the minimum size is six bits, and the address portion uses an unsigned binary representation, then the threshold could correspond to a numerical difference of 63, which is the maximum value representable using the address portion. Alternatively, the address difference may be represented using a signed binary representation, so that, for example, a 6-bit address portion may represent values in the range −32 to 31. In this case, the predetermined threshold could be −32 for negative address differences and 31 for positive address differences. Note that for a negative difference value, the difference may be considered to "exceed" the threshold if it is more negative than the threshold (i.e. its absolute value is greater than the absolute value of the threshold—e.g. a difference of −35 would be considered to "exceed" a threshold of −32).

The trace circuitry may be configured to perform a victim selection operation to select which of the reference address registers is the victim reference address register to which the associated memory address is written during a reference address update. If any reference address is already stored in the victim address register then this would be overwritten by the associated memory address. The trace circuitry may use any kind of victim selection operation, for example, random, least recently used (LRU) or round robin. For example, the registers may be associated with a pointer indicating the most recently updated register, and a round robin victim selection scheme may be implemented by selecting for eviction the register that follows the register indicated by the pointer.

In one embodiment, the trace circuitry may be responsive to a lockdown signal to selectively to exclude at least one reference address register from being updated by the reference address updating operation. Hence, the lockdown signal can be used to dynamically select given registers to ensure that those registers continue to store their current reference addresses. For example, if a particular sequence of program instructions is to use a particular associated memory address a number of times, and a reference address register stores a given reference address that is similar to the repeated associated memory address, then the lockdown signal can be used to inform the trace circuitry that the given reference address should not be discarded or overwritten, increasing the likelihood that the trace stream can be compressed to a significant extent.

It is not necessary for all of the reference address registers to be updatable. In one embodiment there may be at least one fixed reference address register for storing a predetermined reference address. The fixed reference address register may then be excluded from being updated by the reference address updating operation. For example, it may be that a particular memory address is used frequently in program instructions, and hence it can be useful to provide a fixed reference address register storing that address.

In an embodiment, at least one of the reference address registers may be a range-specific reference address register associated with an associated range of memory addresses in the memory address space. The trace circuitry may then exclude the range-specific reference address register from being updated if the associated memory address is outside the associated range for that register. Hence, the range-specific reference address register may only store addresses within the associated range. The associated range need not be a continuous memory range but may also comprise multiple discrete ranges of addresses. In one example, if different range-specific registers are provided each associated with a different address range then this can be used to ensure that the reference address registers store reference addresses which are distributed throughout the total memory address space, so that the likelihood of there being a small difference between the associated memory address and one of the reference addresses is increased. In another example, the reference address registers may be made range-specific so that at least one range of associated memory addresses is excluded from being written to any of the reference address registers.

In one embodiment, at least a subset of the reference address registers may be coupled to form a reference address pipeline and the reference address updating operation may comprise updating the addresses in the pipeline in dependence on the associated memory address. The pipeline can provide a convenient scheme for updating the reference addresses in a way that ensures that less recent associated addresses are overwritten before more recent associated addresses. In the pipeline, the reference address updating operation may include selectively shifting reference addresses between reference address registers of the pipeline.

In one embodiment, the reference address pipeline comprises N reference address registers, and said reference address updating operation comprises shifting reference addresses within the first to $(N-1)^{th}$ reference address registers of said reference address pipeline to a next reference address register of said reference address pipeline, and writing said associated memory address to a first reference address register of said reference address pipeline.

In this example, the first reference address register of the pipeline contains the most recent associated memory address, the second address register contains the second most recent associated memory address, and so on. The contents of the $N^{th}$ address register in the pipeline are lost when a new associated memory address is added to the pipeline. This technique is particularly useful for instruction addresses because it is likely that the same branch destination addresses occur many times in a stream of instructions (for example in program loops), and so by arranging for the pipeline to include reference addresses corresponding to the N most recent associated memory addresses, the probability that the associated memory address matches one of the reference addresses exactly is improved.

Alternatively, the reference address pipeline may comprise N reference address registers, and where the selected reference address register is the $M^{th}$ reference address register of the pipeline (where 1≤M≤N), the reference address updating operation may comprise:

if M>1, then shifting reference addresses within the first to $(M-1)^{th}$ reference address registers of said reference address pipeline to a next reference address register of said reference address pipeline; and writing said associated memory address to a first reference address register of said reference address pipeline.

In this case, which of the reference address registers of the pipeline is updated is dependent on which reference address register was used as the selected reference address register for generating the trace data element. If M>1, then the reference addresses within the reference address registers preceding the selected reference address register are shifted to a next register address register (and hence the selected reference address register is updated with the reference address of the preceding reference address register), and then the associated memory address is written to a first reference address register of the pipeline. In this technique, since the reference address that was used for generating the trace data element is removed from the pipeline and then replaced with the associated memory address, the likelihood of there being multiple duplicate or similar addresses in the pipeline is reduced and so the reference addresses within the pipeline will be distributed more evenly throughout the memory space. Nevertheless, by adding the associated memory address to the first reference address register, the most recent associated memory address will again be at the head of the pipeline and so will stay in the pipeline for a longer time than less recent associated memory addresses. This technique can be particularly useful for data addresses, where the probability of an exact match with a reference address is lower than for instruction addresses and so it can be useful to provide a wide spread of available reference addresses.

If the selected reference address register is the first reference address register of the pipeline (i.e. M=1), then the pipeline operation may further comprise:

determining whether a difference between said associated memory address and the reference address of said first reference address register exceeds a predetermined threshold; and if said difference exceeds said predetermined threshold, shifting reference addresses within the first to $(N-1)^{th}$ reference address registers of said reference address pipeline to a next reference address register of said reference address pipeline before writing said associated memory address to said first reference address register of said reference address pipeline.

This technique again recognises that it would be undesirable to write too many similar address values to the pipeline. If M=1 and the difference between the first reference address and the associated memory address does not exceed a predetermined threshold, then shifting up all the reference addresses in the pipeline and writing the associated memory address to the first reference address register would result in two similar address values being present in the first two registers of the pipeline. Therefore, instead the trace circuitry simply replaces the address of the first reference address register with the associated memory address. On the other hand, if M=1 and the difference between the first reference address and associated memory address exceeds the predetermined threshold, then it is useful to provide both addresses in the pipeline and so the trace circuitry shifts the reference addresses up one stage in the pipeline and then writes the associated memory address to the first reference address register. This technique allows the address registers to be populated without causing too many pipeline shifts that would leave very similar address values in the address registers. Again, the predetermined threshold may corresponding to a minimum address portion size as described above, and may be indicated as either a numerical difference threshold or as a threshold number of bits for the portion of the associated memory address that is different to the corresponding portion of the reference address.

As mentioned above, the trace circuitry may select the selected reference address register in dependence upon which of the address registers corresponds to a most efficient candidate second information value in the pipeline embodiment, when there are multiple reference address registers for which the corresponding candidate second information values are equally efficient, then the trace circuitry may select as the selected reference address register the one of the multiple reference address registers that is closest to the end of the reference address pipeline. This is useful because it ensures that the oldest of the equally efficient reference addresses (i.e. the reference address least likely to be useful for future address tracing) will be removed from the pipeline and replaced by the associated address after being used to generate the trace data.

Alternatively, when there are multiple reference address registers for which the corresponding candidate second information values are equally efficient, then the trace circuitry may select as the selected reference address register any one of the multiple reference address registers.

In one embodiment, the trace circuitry may be responsive to an initialisation event to store a default reference address to each of the plurality of reference address registers. For example, the default reference address may be an address whose bits all have a zero value. The default reference address need not be the same for each of the address registers.

In one embodiment, the initialisation event is the trace circuitry being activated so that when the trace circuitry starts generating a trace stream then the reference address registers all store the known default reference address value. Hence, a diagnostic unit analysing the trace stream can know what the contents of the reference address registers were at the start of the trace stream.

Also, the initialisation event may be a trace synchronisation event for triggering the trace circuitry to generate and output a trace synchronisation data element. This is useful because typically analysis of a trace data element of the trace stream is dependent on analysis of previous trace data elements in the stream (for example, a diagnostic unit may determine the contents of the reference address registers based on the processing outcomes deduced from previous trace data elements). By providing a trace synchronisation event for triggering the trace circuitry to generate and output the trace synchronisation data element, and re-initialising the reference address registers on occurrence of the trace synchronisation event, then the diagnostic unit is provided with a reference point in the trace stream from which the diagnostic unit can begin analysing the trace stream without requiring knowledge of the previous trace data. This means that the diagnostic unit can begin analysing the trace data from the reference point indicated by the trace synchronisation data element rather than having to start at the beginning of the trace stream.

In the present technique, the processing circuitry may be configured to perform data processing operations in response to a plurality of different types of data processing instruction, and for each of those plurality of types the trace circuitry may be configured to select any of the reference address registers, so that the trace circuitry uses the same reference address register for generating trace data elements indicative of different types of data processing instructions. Hence, the selection of the selected reference address register is independent of the type of data processing instruction. Each address register may hold an address associated with any kind of instruction. For any instruction, the trace circuitry has the freedom to select any of the select reference address registers as the selected register, and so the likelihood of a small difference between the associated memory address and one of the reference addresses is greater. Therefore, in comparison to the prior art techniques, which provide only a single address register for any particular type of instruction, it is likely that the trace stream will be compressed to a greater extent. The plurality of types of data processing instruction may include, for example, at least two of a branch instruction, an instruction being executed when an exception event occurs, an instruction to which execution is directed after the exception event has occurred, an instruction currently being executed by the processing circuitry, a load instruction and a store instruction.

Viewed from another aspect, the present invention provides a data processing apparatus comprising:

memory means for storing data, said memory means comprising a plurality of memory locations identified by corresponding memory addresses;

processing means for performing processing operations in response to instructions; and trace means for generating a stream of trace data elements indicative of said processing operations performed by said processing means and for outputting said stream of trace data elements; wherein:

said trace means comprises a plurality of reference address register means for storing a plurality of reference addresses; and said trace means is responsive to said processing means processing an instruction for performing a processing operation associated with an associated memory address to select one of said plurality of reference address register means as a selected reference address register means and to generate and output a trace data element indicating.

(i) first information indicative of which of said plurality of reference address register means is said selected reference address register means; and (ii) second information indicative of a difference between said associated memory address and a selected reference address stored in said selected reference address register means.

Viewed from a further aspect, the present invention provides a data processing method for a data processing apparatus comprising a memory comprising a plurality of memory locations identified by corresponding memory addresses, said method comprising the steps of:

performing processing operations in response to instructions;

storing a plurality of reference addresses in a plurality of reference address registers;

generating a stream of trace data elements indicative of said processing operations performed by said processing circuitry; and outputting said stream of trace data elements; wherein:

said step of generating a stream of trace data elements comprises, in response to performance of a processing operation associated with an associated memory address, selecting one of said plurality of reference address registers as a selected reference address register and generating and outputting a trace data element indicating:

(i) first information indicative of which of said plurality of reference address registers is said selected reference address register; and (ii) second information indicative of a difference between said associated memory address and a selected reference address stored in said selected reference address register.

Viewed from yet another aspect, the present invention provides a trace unit for monitoring processing operations performed by a processing apparatus in response to instructions, said processing apparatus comprising a memory comprising a plurality of memory locations identified by corresponding memory addresses; said trace unit comprising:

trace circuitry configured to generate a stream of trace data elements indicative of said processing operations performed by said processing apparatus and to output said stream of trace data elements; wherein:

said trace circuitry comprises a plurality of reference address registers configured to store a plurality of reference addresses; and said trace circuitry is responsive to said processing apparatus processing an instruction for performing a processing operation associated with an associated memory address to select one of said plurality of reference address registers as a selected reference address register and to generate and output a trace data element indicating (i) first information indicative of which of said plurality of reference address registers is said selected reference address register; and (ii) second information indicative of a difference between said associated memory address and a selected reference address stored in said selected reference address register.

Viewed from a further aspect, the present invention provides a trace unit for monitoring processing operations performed by a processing apparatus in response to instructions, said processing apparatus comprising a memory means for storing data, said memory means comprising a plurality of memory locations identified by corresponding memory addresses; said trace unit comprising:

trace means for generating a stream of trace data elements indicative of said processing operations performed by said processing apparatus and for outputting said stream of trace data elements; wherein:

said trace means comprises a plurality of reference address register means for storing a plurality of reference addresses; and said trace means is responsive to said processing apparatus processing an instruction for performing a processing operation associated with an associated memory address to select one of said plurality of reference address register means as a selected reference address register means and to generate and output a trace data element indicating:
(i) first information indicative of which of said plurality of reference address register means is said selected reference address register means; and
(ii) second information indicative of a difference between said associated memory address and a selected reference address stored in said selected reference address register means.

Viewed from another aspect, the present invention provides a diagnostic apparatus for analysing a stream of trace data elements indicative of processing operations performed by a processing apparatus in response to instructions, said processing apparatus comprising a memory comprising a plurality of memory locations identified by corresponding memory addresses, said diagnostic apparatus comprising:

a trace input for receiving said stream of trace data elements; and diagnostic circuitry configured to analyse said stream of trace data elements to determine a processing outcome of said processing operations; wherein:

said diagnostic circuitry comprises a plurality of reference address registers configured to store a plurality of reference addresses; and said diagnostic circuitry is responsive to an indication of said processing apparatus processing an instruction for performing a processing operation associated with an associated memory address to:
(a) locate in said stream of trace data elements a trace data element indicating (i) first information indicative of which of said plurality of reference address registers is a selected reference address register; and (ii) second information indicative of a difference between said associated memory address and a selected reference address stored in said selected reference address register; and
(b) determine said associated memory address in dependence on said second information and said selected reference address stored in said selected reference address register.

The diagnostic apparatus for analysing the generated trace data elements may include reference address registers corresponding to those in the trace unit of the processing apparatus. When analysing the trace data elements the diagnostic circuitry has access to an indication of which instructions were executed by the processing apparatus. When the diagnostic circuitry comes across an indication that the processing apparatus processed an instruction for performing a processing operation associated with an associated memory address, then the diagnostic circuitry can locate in the stream of trace data elements a corresponding trace data element. The corresponding trace data element indicates first information indicating the selected reference address register that was selected by the trace unit when generating the trace data elements, and second information indicating the difference between the associated memory address and the selected reference address stored in the selected reference address register. The diagnostic circuitry can then access the reference address register indicated by the first information and determine the associated memory address in dependence on the second information and the selected reference address stored in the reference address register. Hence the diagnostic circuitry can decompress the trace stream to identify the associated memory address.

Again, while a variety of encodings of trace data element may be used, in one embodiment the trace data elements may comprise a header portion indicating the first information and an address portion indicating the second information. In the case where the trace data element is found not to include the address portion, then the diagnostic circuitry may determine that the associated memory address is the same as the selected reference address. Hence, an absence of the address portion signifies that there was an exact match between associated memory address and the selected reference address.

In the case where the second information is indicated as a portion of the associated memory address having different bit values to a corresponding portion of the selection address, then the diagnostic circuitry may determine the associated memory address as having an address value that is equivalent to a value obtained by (i) starting with the bit values of said selected reference address, and (ii) replacing bit values of said corresponding portion of said selected reference address with bit values of said portion of said associated memory address indicated by said second information. It will be appreciated that the diagnostic circuitry need not actually perform steps (i) and (ii) but may perform any combination of logical or arithmetic operations that result in an address value having a value equivalent to a value obtained by performing steps (i) and (ii).

Alternatively, where the second information indicates a numerical difference between the associated memory address and the selected reference address, then the diagnostic circuitry may determine the associated memory address by adding that numerical difference to the selected reference address.

The diagnostic circuitry may, after determining the associated memory address, selectively update the reference address of one of the plurality of reference address registers by performing a reference address updating operation in a corresponding way to the trace unit.

The reference address updating operation may comprise writing said associated memory address to a victim reference address register of said plurality of reference address registers.

The reference address updating operation may comprise:
(a) determining for at least one reference address register whether or not an address difference between the corresponding reference address and said associated memory address exceeds a predetermined threshold; and
(b) if said address difference exceeds said predetermined threshold for each of said at least one reference address register, then writing said associated memory address to a victim reference address register selected from said at least one reference address register.

The trace data element may comprise an address portion indicating said second information, and the predetermined threshold may correspond to a minimum size of said address portion.

The diagnostic circuitry may be configured to perform a victim selection operation to select which of said plurality of reference address registers is the victim reference address register.

The diagnostic circuitry may be responsive to a lockdown signal to selectively exclude at least one reference address register from being updated by the reference address updating operation.

At least one of the plurality of reference address registers may be a fixed reference address register for storing a predefined reference address, and the diagnostic circuitry may exclude the fixed reference address register from being updated by said reference address updating operation.

At least one of said plurality of reference address registers may be a range-specific reference address register associated with an associated range of said memory addresses, and the diagnostic circuitry may exclude the range-specific reference address register from being updated by the reference address updating operation if the associated memory address is outside the associated range of said memory addresses.

At least a subset of the plurality of reference address registers may be coupled to form a reference address pipeline, and the reference address updating operation may comprise updating the reference addresses in the reference address pipeline in dependence on the associated memory address.

The reference address pipeline may comprise N reference address registers; and said reference address updating operation may comprise shifting reference addresses within the first to $(N-1)^{th}$ reference address registers of said reference address pipeline to a next reference address register of said reference address pipeline, and storing said associated memory address to a first reference address register of said reference address pipeline.

The reference address pipeline may comprise N reference address registers, the selected reference address register may comprise an $M^{th}$ reference address register of said reference address pipeline, where $1 \leq M \leq N$, and the reference address updating operation may comprise:

if $M>1$, then shifting reference addresses within the first to $(M-1)^{th}$ reference address registers of said reference address pipeline to a next reference address register of said reference address pipeline; and storing said associated memory address to a first reference address register of said reference address pipeline.

If $M=1$, then the reference address updating operation may further comprise:

determining whether a difference between said associated memory address and the reference address of said first reference address register exceeds a predetermined threshold; and if said difference exceeds said predetermined threshold, shifting reference addresses within the first to $(N-1)^{th}$ reference address registers of said reference address pipeline to a next reference address register of said reference address pipeline before writing said associated memory address to said first reference address register of said reference address pipeline.

Again, the predetermined threshold may correspond to the minimum size of address portion. The predetermined threshold may be a threshold number of bits for the portion of the associated memory address that is different to a corresponding portion of the reference address of the first reference address register, or may be a threshold numerical difference.

The diagnostic circuitry may respond to an initialisation event by storing a default reference address to each of the reference address registers in a corresponding way to the trace unit. The initialisation event may be the diagnostic circuitry being activated to start analysing trace stream, so that default reference addresses are used at the start of analysis of the trace stream. Also, the initialisation event may be the diagnostic circuitry responding to a trace synchronisation data element in the stream of trace data elements. Since the reference address registers are re-initialised at the trace synchronisation data element, then the trace synchronisation data element provides a reference point at which trace data analysis can be started without requiring information derived from previous trace data elements.

Viewed from another aspect, the present invention provides a diagnostic apparatus for analysing a stream of trace data elements indicative of processing operations performed by a processing apparatus in response to instructions, said processing apparatus comprising memory means for storing data, said memory means comprising a plurality of memory locations identified by corresponding memory addresses, said diagnostic apparatus comprising:

trace input means for receiving said stream of trace data elements; and diagnostic means for analysing said stream of trace data elements to determine a processing outcome of said processing operations; wherein:

said diagnostic means comprises a plurality of reference address register means for storing a plurality of reference addresses; and said diagnostic means is responsive to an indication of said processing apparatus processing an instruction for performing a processing operation associated with an associated memory address to:

(a) locate in said stream of trace data elements a trace data element indicating (i) first information indicative of which of said plurality of reference address register means is a selected reference address register means; and (ii) second information indicative of a difference between said associated memory address and a selected reference address stored in said selected reference address register means; and (b) determine said associated memory address in dependence on said second information and said selected reference address stored in said selected reference address register means.

Viewed from a further aspect, the present invention provides a method for analysing a stream of trace data elements indicative of processing operations performed by a processing apparatus in response to instructions, said processing apparatus comprising a memory comprising a plurality of memory locations identified by corresponding memory addresses, said method comprising the steps of:

receiving said stream of trace data elements;

storing a plurality of reference addresses in a plurality of reference address registers; and analysing said stream of trace data elements to determine a processing outcome of said processing operations; wherein:

said step of analysing comprises, in response to an indication of said processing apparatus processing an instruction for performing a processing operation associated with an associated memory address:

(a) locating in said stream of trace data elements a trace data element indicating (i) first information indicative of which of said plurality of reference address registers is a selected reference address register; and (ii) second information indicative of a difference between said associated memory address and a selected reference address stored in said selected reference address register; and (b) determining said associated memory address in dependence on said second information and said selected reference address stored in said selected reference address register.

The above, and other objects, features and advantages of this invention will be apparent from the following detailed description of illustrative embodiments which is to be read in connection with the accompanying drawings.

BRIEF DESCRIPTION OF THE DRAWINGS

FIG. 2 illustrates the generation of a trace data element in which a difference between an associated address and a selected reference address is indicated as a portion of the associated address having different bit values to a corresponding portion of the selected reference address;

FIG. 3 illustrates the generation of a trace data element in which a difference between an associated address and a selected reference address is indicated as a numerical difference between the associated address and the selected reference address;

FIG. 4 illustrates different ways of indicating in the trace data element that there is an exact match between an associated memory address and a selected reference address;

FIG. 7 schematically illustrates a reference address pipeline comprising a number of reference address registers;

FIG. 8 schematically illustrates a reference address updating operation for updating the reference address registers in the reference address pipeline;

FIG. 9 is a table showing an example of how the reference address registers in the pipeline can be updated in response to associated memory addresses used by a sequence of processing operations;

DESCRIPTION OF THE EMBODIMENTS

Figure 1:
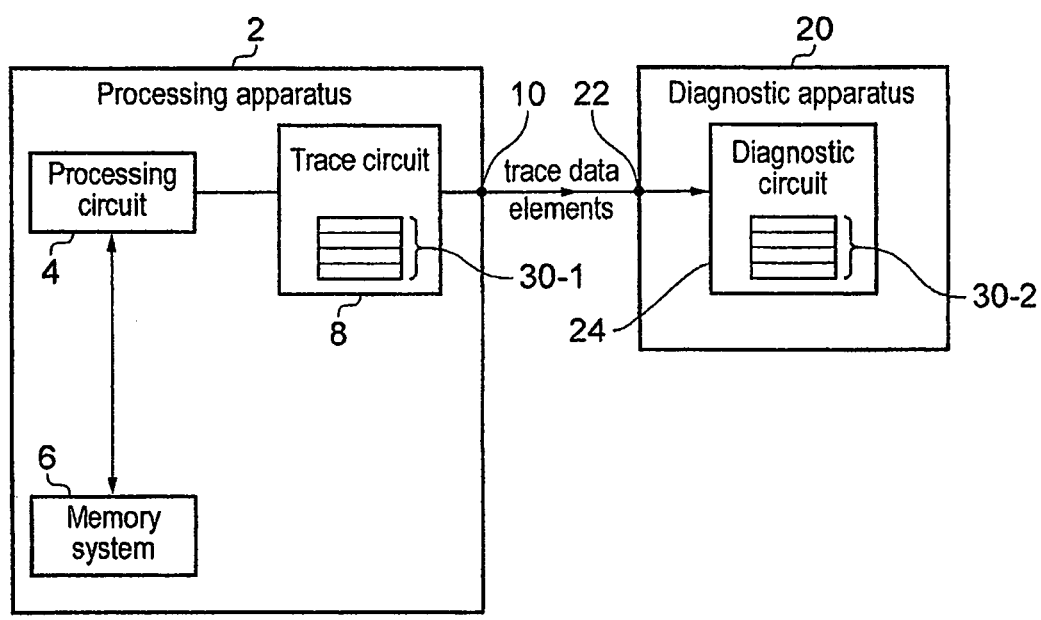
FIG. 1 schematically illustrates a processing apparatus, trace circuit and diagnostic apparatus.

FIG. 1 schematically illustrates a processing apparatus 2 comprising a processing circuit 4, a memory system 6, and a trace circuit 8. The memory system 6 comprises one or more cache units or memory units for storing data and/or instructions on behalf of the processing circuit 4. The processing circuit 4 performs processing operations in response to instructions. The trace circuit 8 generates a stream of trace data elements indicative of the processing operations performed by the processing circuit 4 and outputs the stream of trace data elements via a trace output port 10.

The processing circuit 4, memory system 6 and trace circuit 8 need not necessarily be provided on the same integrated circuit. For example, the trace circuit 8 may in some embodiments be provided as an independent trace unit provided separately from the rest of the processing apparatus 2.

The stream of trace data elements generated by the trace circuit 8 may be received by a diagnostic apparatus 20 for analysing the trace stream. The trace data elements are received at a trace input port 22. The diagnostic apparatus 20 has a diagnostic circuit 24 for analysing the trace data elements to determine a processing outcome of the processing operations performed by the processing circuit 4. The diagnostic circuit 24 has access to an indication of which instructions were executed by the processing circuit 4 at the time the trace data was generated. This indication may be provided, for example, as an indication of the memory address within the memory system 6 from which program execution was started by the processing circuit. Alternatively, the trace circuit 8 can include in the trace stream an indication of which instructions were executed. Also, the diagnostic apparatus 20 may itself include a memory (not illustrated in FIG. 1) for storing a copy of the program executed by the processing circuit 4. The diagnostic circuit 24 uses the indication of which instructions were executed and the additional information provided by the trace data elements to deduce the outcome of the processing operations performed by the processing circuit 4. The trace data elements need not be output directly from the processing apparatus 2 to the diagnostic apparatus 20 but may be stored in a memory-device by the trace circuit 8 and then accessed from the memory device by the diagnostic circuit 24. The diagnostic apparatus 20 may be, for example, a general-purpose computer programmed to analyse the trace stream.

The trace circuit 8 comprises two or more reference address registers 30-1 for storing two or more reference addresses. When the trace circuit 8 generates a trace data element in response to the processing circuit 4 performing a processing operation associated with an associated memory address, the trace circuit 8 selects one of the reference address registers 30-1, determines a difference between the associated memory address and the reference address of the selected reference address register and then generates a trace data element indicating first information indicating which of the reference address registers 30-1 was the selected reference address register, and second information indicating the difference, if any, between the associated memory address and the reference address of the selected reference address register.

The diagnostic apparatus 20 has a corresponding set of reference address registers 30-2. When analysing a trace stream, the diagnostic circuit 24 maintains the reference address registers 30-2 to contain reference addresses corresponding to the reference addresses that were in the reference address registers 30-1 of the trace circuit 8 at the time that the trace stream was generated. When the diagnostic circuitry comes across an indication that the processing circuit 4 performed a processing operation associated with an associated memory address, then the diagnostic circuitry 24 locates in the trace stream the trace data element corresponding to that operation. The diagnostic circuitry 24 uses the first information indicated by the trace data element to determine a selected reference address register from among the reference address registers 30-2. The diagnostic circuit 24 then determines the value of the associated memory address in dependence on the second information indicating the difference, if any, between the associated memory address and the reference address of the selected reference address register.

By providing two or more reference address registers 30-1 in the trace circuit 8 and corresponding reference address registers 30-2 in the diagnostic circuit 24, then the likelihood of an associated memory address matching a reference address in one of the reference address registers 30-1, or being similar to one of the reference addresses, is increased and so the likelihood that the trace data can be compressed to a significant extent is improved. Below, the reference numeral 30 will be used to refer to the reference address registers of both the trace circuit 8 and the diagnostic circuit 24 to describe features common to both sets of registers.

Generally, the trace circuit 8 selects as the selected reference address register the register 30-1 which, if used to generate the trace data element, would result in the most efficient encoding of the trace data element. One way of doing this is by determining candidate values corresponding to each reference address register 30-1, each candidate value indicating the difference between the associated memory address and the corresponding reference address of that reference address register 30-1. The trace circuit 8 can then select as the selected reference address register the reference address register 30-1 which corresponds to the most efficient candidate value. The most efficient candidate value may be, for example, the value which can be represented using the smallest number of bits, or the value which if included in the trace data element would result in the smallest total amount of trace data in the trace stream. By selecting the reference address register 30-1 which results in the most efficient encoding of the trace data, the amount of trace data can be reduced. The trace circuit 8 includes first information in the trace data element to signal to the diagnostic apparatus 20 which register 30-1 was selected, so that the diagnostic apparatus 20 can make a corresponding selection from its registers 30-2 when analysing the trace stream.

The difference between the associated memory address and the selected reference address may be indicated in different ways. FIG. 2 illustrates an example in which the difference is indicated as a portion of the associated memory address having different bit values to a corresponding portion of the reference address. For example, the trace data element may indicate any least significant bits of the associated memory address that are different to corresponding least significant bits of the reference address, while more significant bits of the associated memory that are the same as corresponding bits of the reference address may be omitted. For example, in FIG. 2 the associated memory address 0x00004012 differs from the reference address 0x00000000 in reference address register 0 by a portion 0x4012.

The trace circuit 8 compares the associated memory address with the reference addresses in each reference address register 30-1 and determines a candidate difference value for each reference address register. In the example of FIG. 2, each candidate difference value represents the portion of the associated address that is different to the corresponding portion of the corresponding reference address. The most efficient candidate value is then determined, for example as the candidate value having the fewest bits or the candidate value which would result in the smallest amount of trace data. The corresponding reference address register is then selected as the selected reference address register (in the example of FIG. 2, reference address register 1 is selected because its corresponding candidate value provides the most efficient trace encoding). A trace data element is generated including first information indicating which of the reference address registers 30-1 was the selected reference address register, and second information corresponding to the most efficient candidate value.

In this example, the trace data element includes a header portion 40 indicating the selected reference address register and an address portion 42 indicating the difference value. When analysing the trace data element, then the diagnostic apparatus 20 can determine the associated memory address using the reference address of the reference address register 30-2 identified by the header portion 40, and the address difference identified by the address portion 42. Alternatively, a trace encoding could be devised in which the selected address register and difference value are encoded in a common portion of the trace data element.

FIG. 3 shows another embodiment in which the address difference is indicated as a numerical difference between the associated memory address and the reference address. In this example, the trace circuit 8 determines candidate difference values for each of the reference address registers 30, each candidate value being obtained by subtracting one of the associated memory address and the reference address from the other. The most efficient candidate value can then be selected as the value that is representable using the fewest bits or which results in the least amount of trace data. The corresponding reference address register is then selected as the selected reference address register for use in generating the trace data element. Again, the trace data element may include a header portion 40 and an address portion 42, or may have an encoding in which the selected reference address register can be identified and the difference value indicated using a common value.

When analysing the trace data elements shown in FIG. 3, then the diagnostic circuit 24 can determine the associated memory address by adding the difference value indicated in the trace data element to the address stored in the selected reference address register 30-2 identified by the header portion of the trace data element.

Sometimes, the associated memory address may match one of the reference addresses exactly. In this case, the trace data may be encoded in a number of ways, such as the examples shown in FIG. 4. In example A, the trace data element indicates that there was an exact match between the associated memory address and the reference address of the selected reference address register by setting the address portion of the trace data element to a zero value. Alternatively, in example B the address portion is set to an identifying code indicating that there was an exact match.

As shown in example C of FIG. 4, the exact match can also be signified by an absence of an address portion. In this case, a trace data element including only a header portion can indicate that the associated memory address was the same as the reference address of the reference address register identified in the header portion. Hence, in example C the second information is conveyed by the absence of an address portion rather than any particular data value.

As shown in example D of FIG. 4, the address header identifying the selected reference address register could also be modified to indicate that there was an exact match to the address stored in that address register.

Hence, FIG. 4 shows that a zero difference between the associated memory address and the selected reference address may be indicated in a number of ways. It is not necessary for every trace data element to comprise separate values for indicating the first information and second information. In examples C and D, for example, a single data value provides both the first information identifying the selected reference address register and the second information identifying that there is a zero difference.

Typically, the trace circuit 8 will be arranged to update the reference addresses stored in the reference address registers 30-1 in dependence on the addresses being used by the processing circuit 4. A given sequence of program instructions is likely to use the same or similar addresses a number of times. For example, a sequence of instructions may be looped a number of times so that a same branch destination address is used repeatedly, or a sequence of instructions may result in load/store operations associated with a series of neighbouring memory addresses. By selectively updating the reference address registers 30-1 in dependence on the associated memory address, then that associated memory address can be used as a reference address for a following processing operation, and so the likelihood of the address associated with the following operation being similar to one of the reference addresses is improved. In a corresponding way, the diagnostic circuit 24 can update the reference addresses of its reference address registers 30-2 based on the associated memory addresses determined from the trace stream.

The trace circuit 8 and diagnostic circuit 24 need not update the reference address registers 30 with every associated memory address. It may be undesirable to add many similar addresses to the reference address registers as this would concentrate the ability to compress the trace stream into a particular memory range of the available memory space. Instead, a number of reference addresses which are distributed throughout the memory address space may increase the probability that there is a relatively small difference between the associated memory address and one of the reference addresses. Therefore, after generating a trace data element, the trace circuit 8 may in one embodiment be arranged to compare the associated memory address with the existing reference addresses of the address registers 30-1, and then update one of the reference address registers 30-1 with the associated memory address only if the difference between the associated memory address and one of the existing reference addresses is greater than a predetermined threshold. The diagnostic circuit 24 may also perform a similar comparison and update the reference address register 30-2 in a corresponding way to the trace circuit 8.

The threshold for determining whether it is worth updating one of the reference address registers 30 may be determined in a number of ways, for example, as a threshold number of bits for the portion of the associated memory address register having different bit values to the corresponding portion of the reference address, or as a numerical difference threshold. If the trace data element includes an address portion 42 for indicating the difference between the associated memory address and the selected reference address, then the threshold may correspond to the minimum size of the address portion 42. For example, if the address portion had a minimum size of four bits, then it may be desirable to avoid updating the reference addresses with an associated memory address that differs from one of the existing reference addresses by an address difference that is representable with four bits or fewer (i.e. if the address difference has a numerical value of 15 or fewer).

The trace circuit 8 and diagnostic circuit 24 may be initialised with the reference address registers 30 storing a default reference address value. For example, the default value could be an address value of zero. Also, periodically the trace circuit 8 may reset the reference address registers 30-1 to the default value and generate a trace synchronisation packet. The diagnostic apparatus 20 may then respond to the trace synchronisation packet by resetting its reference address registers 30-2 to the default value. The synchronisation event may be for example a periodic event which enables the diagnostic apparatus 20 to begin analysing the trace stream at an intermediate point indicated by the trace synchronisation packet, rather than having to start analysis at the beginning of the trace stream.

Figure 5:
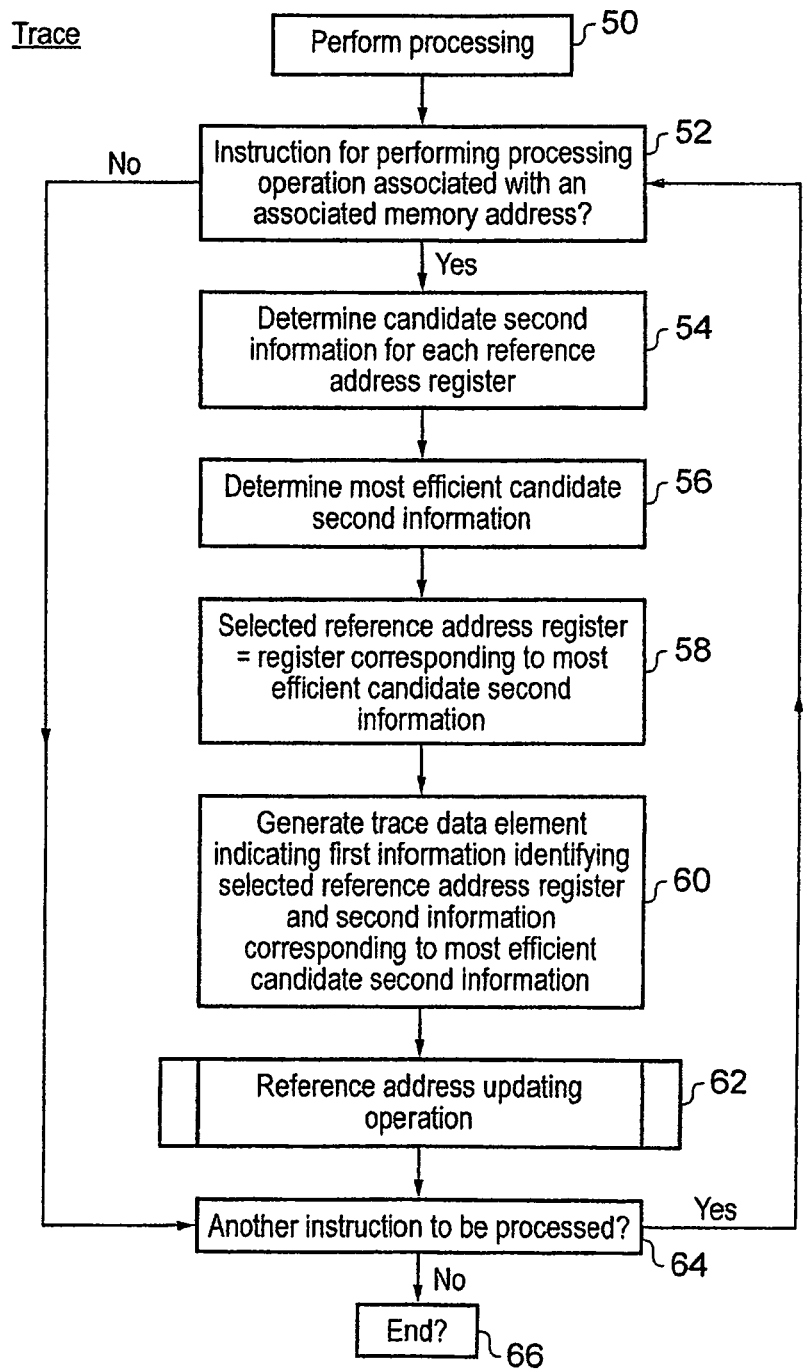
FIG. 5 schematically illustrates a method for generating trace data elements.

FIG. 5 illustrates a method of generating a stream of trace data elements. At step 50, the processing apparatus 2 begins performing processing operations in response to instructions. The trace circuit 8 monitors which instructions are being executed by the processing circuit 4. At step 52, the trace circuit 8 determines whether the processing circuit 4 is executing an instruction for performing a processing operation associated with an associated memory address to be traced (the trace unit may trace only a subset of the associated memory addresses).

If the current instruction is associated with an associated memory address to be traced, then at step 54 the trace circuit 8 determines candidate second information for each reference address register 30-1. The candidate second information may be for example the difference values of the form shown in the examples of FIG. 2 and FIG. 3. At step 56, the trace circuit 8 determines the most efficient of the candidate second information values. For example, the most efficient candidate second information may be the information that can be represented using the fewest bits or will result in least trace data. Then, at step 58 the trace circuit 8 selects as a selected reference address register the reference address register 30-1 corresponding to the most efficient candidate second information. At step 60, the trace circuit 8 generates a trace data element indicating first information and second information. The first information identifies which address register 30-1 is the selected reference address register. The second information corresponds to the most efficient candidate second information and indicates a difference, if any, between the associated memory address and the reference address stored in the selected reference address register. The trace data element is then output as part of the trace stream. At step 62, the trace circuit 8 then performs a reference address updating operation for selectively updating at least one reference address register 30-1 in dependence upon the associated memory address. The reference address updating operation can have a number of forms, as will be described below.

If at step 52 it is determined that the current instruction is not an instruction associated with an associated memory address, then steps 54 to 62 are omitted. The trace circuit 8 may perform other kinds of tracing operation for instructions not associated with a memory address to be traced.

At step 64 the trace circuit 8 determines whether or not the processing circuit 4 is processing another instruction. If there is another instruction, then the method returns to step 52, while if there are no further instructions, then the method ends at step 66.

Hence, by performing the method of FIG. 5 the trace circuit 8 can output a stream of trace data elements indicating the operations of the processing circuit 4. When an associated memory address is traced, then the trace data elements identifies one of the selected reference address registers and a difference between the associated memory address and the address of the selected reference address register. By selecting the reference address register which can provide the most efficient difference information, the amount of trace data can be reduced.

Figure 6:
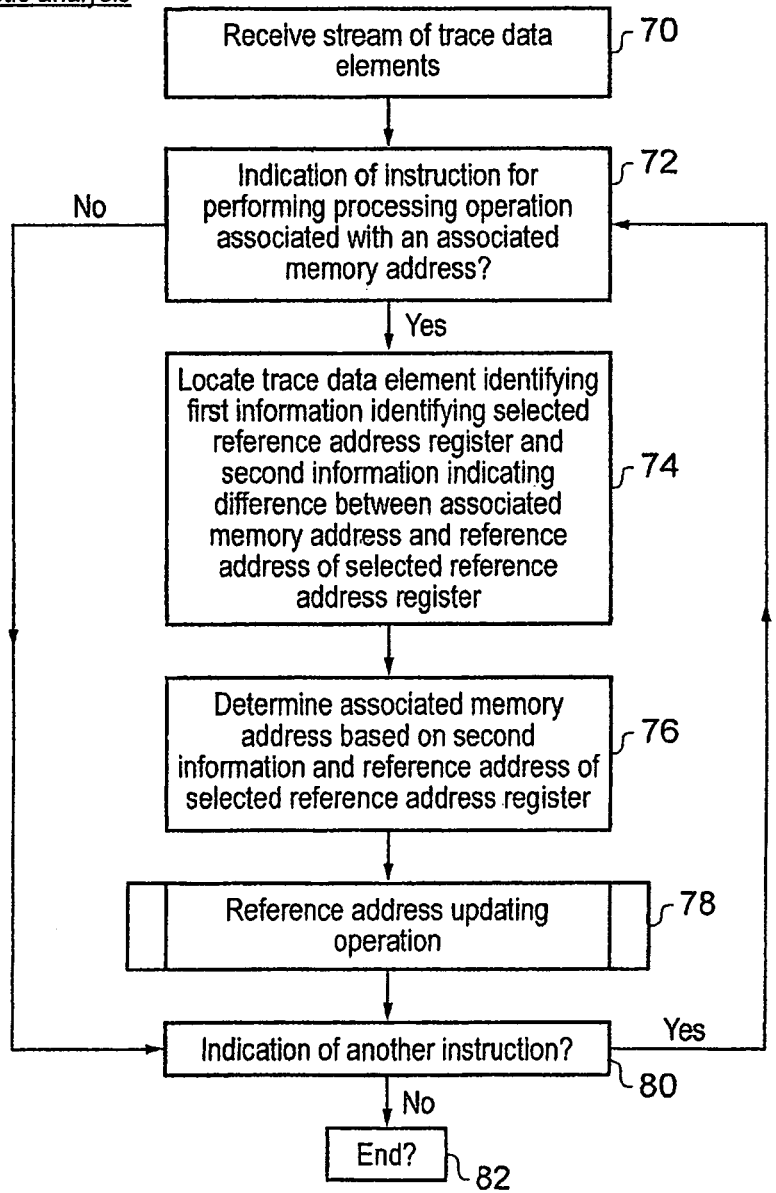
FIG. 6 schematically illustrates a corresponding method of analysing a stream of trace data elements.

FIG. 6 illustrates a corresponding method for analysing the trace data elements generated by the trace circuit 8. At step 70, the diagnostic apparatus 20 receives a stream of trace data elements, either directly from the trace circuit 8 or from a memory or other storage device that stores the trace data elements until they are analysed. The diagnostic apparatus 20 also has access to an indication of which program instructions were executed by the processing circuit 4 when the trace stream was generated. At step 72, the diagnostic circuit 24 determines whether or not the processing circuit 4 executed an instruction for performing a processing operation associated with an associated memory address to be traced. If there is such an instruction, then at step 74 the diagnostic circuit 24 locates in the trace stream a trace data element associated with that instruction. The trace data element includes first information identifying the selected reference address register that was selected by the trace circuit 8 and second information indicating the difference between the associated memory address and the reference address of the selected reference address register. The diagnostic circuit 24 then selects one of its reference address registers 30-2 corresponding to the first information indicated in the trace data element. At step 76, the diagnostic circuit 24 determines the associated memory address based on the second information included in the trace data element and the reference address stored in the selected reference address register 30-2. Hence, the diagnostic apparatus 20 can reconstruct the associated memory address from the first and second information included in the trace data element. At step 78, the diagnostic apparatus 20 performs a reference address updating operation for selectively updating the reference addresses of the reference address registers 30-2 in dependence on the associated memory address, in a corresponding way to step 62 of FIG. 5. Different forms of reference updating will be described below. In one example described below with respect to FIGS. 10-12, the reference address updating operation performed by the diagnostic apparatus 20 is dependent on which reference address register 30-2 is the selected reference address register (the diagnostic apparatus 20 can identify the selected reference address register from the first information indicated in the trace data element), and may also be dependent on a threshold difference value which controls the way in which the reference address registers are updated.

If at step 72 the indication was of an instruction that is not associated with an associated memory address to be traced, then steps 74 to 78 are omitted by the diagnostic circuit 24. The diagnostic circuit 24 may perform other kinds of trace analysis for such instructions.

At step 80 the diagnostic circuit 24 determines whether there is an indication of another instruction that was-executed by the processing circuit 4. If no more instructions were executed, then the method ends at step 82, while otherwise the new method returns to step 72.

Various examples of the reference address updating operation performed in steps 62 and 78 of FIGS. 5 and 6 will now be described. In the example of FIG. 7, at least some of the reference address registers 30 are arranged to form a reference address pipeline. The pipeline need not include all of the reference address registers 30 and in some examples may include only a subset of the registers 30. When generating a trace data element, the trace circuit 8 may select as a selected reference address register any of the registers in the pipeline. To update one of the reference addresses, the associated memory address is written to the first reference address register in the pipeline, and the addresses within the pipeline are shifted to the next register in the pipeline. The address within the final register of the pipeline is shifted out of the pipeline.

FIG. 8 illustrates the reference address updating operation of steps 62 and 78 for the example of FIG. 7. There are N reference address registers in the pipeline. At step 100, the reference addresses of the first to $(N-1)^{th}$ reference address registers are shifted to the next reference address register in the pipeline. Then, at step 102 the associated memory address is written to the first reference address register in the pipeline. In this way, the most recent associated memory address is always at the front of the pipeline, and successive registers within the pipeline contain progressively less recent associated memory addresses.

FIG. 9 shows a table illustrating an example of this reference address updating operation for a pipeline containing two address registers, address register 0 and address register 1. FIG. 9 shows the generation of six trace data elements for a series of six associated memory addresses.

Both address registers initially store a default address 0x00000000. In response to an associated address 0x00000001, one of these registers (e.g. register 0) is selected as the selected reference address register and a trace data element is generated indicating the selected address register and an address value 0x01 indicating a portion of the associated memory address which is different from a corresponding portion of the address in the selected address register. Then, the associated memory address is placed-in address register 0, and the value stored in the address register 0 is shifted to address register 1.

Similarly, at each step of FIG. 9, the address register that results in the most efficient trace data element is selected, a trace data element is generated using the selected address register, and the associated memory address is then shifted into the pipeline. For example, in steps 4 and 5 of FIG. 9, the associated memory address is more similar to the address stored in address register 1 than the address stored in the address register 0 and so in this case address register 1 is selected as the selected reference address.

When the diagnostic circuit 24 analyses the trace stream then it updates the address registers 30-2 in a similar way to the trace circuit 8, so that the values stored in the address registers 30-2 of the diagnostic circuit 24 will change in a corresponding way to the registers 30-1 in the trace circuit 8.

Figures 10, 12:
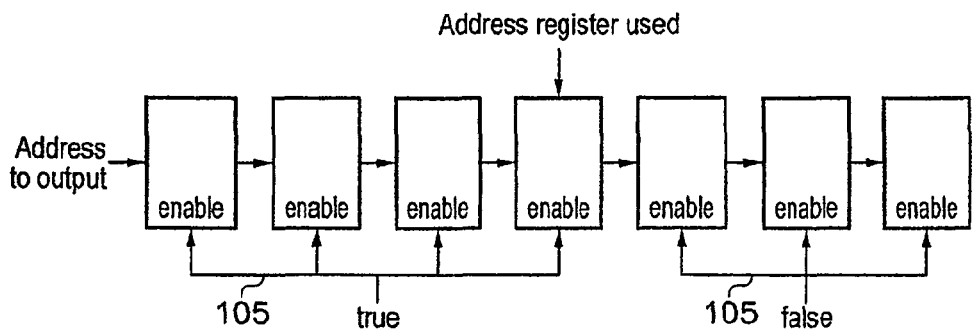
FIG. 10 illustrates another example of a reference address pipeline.
FIG. 12 is a table illustrating an example of how the reference addresses may be updated using the example of FIGS. 10 and 11.
Figure 11:
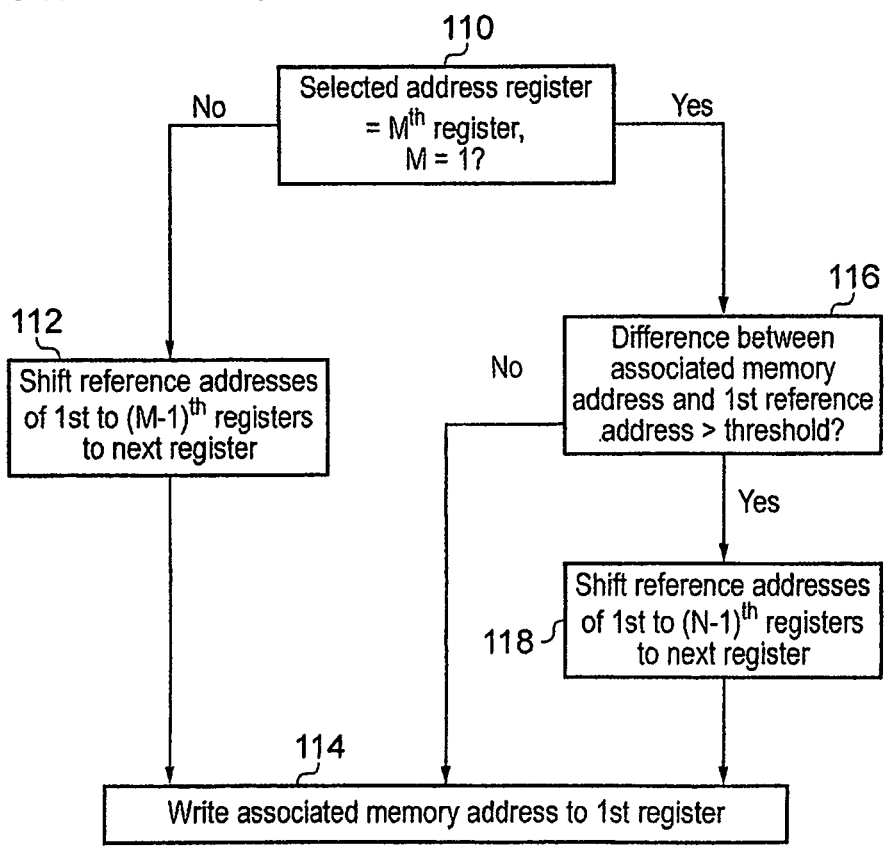
FIG. 11 illustrates a reference address updating operation for updating the reference addresses in the pipeline of the form illustrated in FIG. 10.

FIGS. 10 to 12 show another example of a reference address pipeline used by the trace circuit 8 and diagnostic circuit 24. Again, the pipeline comprises N reference address registers 30. In this example, the way in which the pipeline is updated depends on which reference address register was selected as the selected reference address register for generating the trace data element. Each reference address register 30 is associated with a corresponding enable signal 105 which controls whether or not the reference address register 30 is updated with the address stored in the preceding register of the pipeline (or in the case of the first reference address register of the pipeline, whether it is updated with the associated memory address). When an associated memory address is traced, and the selected reference address register is not the first reference address register in the pipeline, then the enable signals for the second reference address register to the selected reference address register are set to a "true" value so that these registers capture the address stored in the preceding register of the pipeline. Reference address registers that are further up the pipeline than the selected reference address register have their enable signal set to a "false" value so that the corresponding reference addresses are unchanged. The first reference address register is selectively updated with the new associated memory address.

For example, in FIG. 10 the fourth address register in the pipeline is the selected reference address register. In this case, the enable signals for the second to fourth registers 30 of the pipeline are set to the "true" value so that the second to fourth registers 30 capture the addresses previously stored in the first to third registers 30 respectively. Also, the enable signal for the first reference address register is set to the "true" value so that the first reference address register captures the associated memory address. In contrast, the fifth to seventh reference address registers in the pipeline have their enable signal set to the "false" value so that the addresses stored in these registers are unchanged.

In the example of FIG. 10, if more than one address register can be used to produce equally efficient trace data, then the trace circuit 8 selects as the selected address register the register that is closest to the end of the pipeline (i.e. the address that has resided in the pipeline for the longest time). Thus, the last address register would take priority, followed by the second last register, then the third last and so on. By preferentially selecting an older reference address over a newer reference address when those addresses produce equally efficient trace data, the trace circuit 8 will tend to keep the most useful reference addresses in the pipeline.

When the first reference address register of the pipeline is the selected reference address register used for generation of the trace data element, then there may be a special case for updating the reference addresses. In this case, the trace circuit 8 or diagnostic circuit 24 can determine a difference between the associated memory address and the reference address of the first reference address register. If this difference does not exceed a given threshold, then the first reference address register is updated while leaving the other address registers unchanged. On the other hand, if the difference exceeds the threshold, then the second to final address registers of the pipeline are each updated using the address stored in the preceding register of the pipeline, and the associated reference address is written to the first address register. This mechanism achieves a better spread of addresses throughout the address range of the memory space, by avoiding too many pipeline shifts that would leave similar values in all of the address registers.

FIG. 11 shows an example of the reference address updating operation that may be performed in steps 62 and 78 of FIGS. 5 and 6, when a subset of the address registers form a reference address pipeline as shown in FIG. 10. At step 110, the trace circuit 8 or diagnostic circuit 24 determines which of the N registers within the pipeline is the selected reference address register. The selected address register is the $M^{th}$ register of the pipeline (1≤M≤N). The trace circuit 8 or diagnostic circuit 24 also determines whether M equals 1.

If M does not equal 1, then at step 112, the reference addresses of the first to $(M-1)^{th}$ reference address registers are shifted to the next register in the pipeline. The method then proceed to step 114 where the associated memory address is written to the first register in the pipeline.

On the other hand, if M=1, then at step 116 it is determined whether the difference between the associated memory address and the reference address of the first register in the pipeline is greater than a given threshold. If the difference is not greater than the threshold, then the method proceeds to step 114, where the associated memory address is written to the first address register without modifying the addresses in the other address registers of the pipeline. If at step 116, the difference between the associated memory address and the first reference address is larger than the threshold, then at step 118 the reference addresses of the first to $(N-1)^{th}$ registers of the pipeline are shifted to the next register in the pipeline before writing the associated memory address to the first register at step 114.

In summary, the reference address updating operation of FIG. 11 ensures that if a reference address register other than the first reference address register is used as the selected reference address register, then the used reference address is removed from the pipeline, any preceding addresses in the pipeline are shifted up one stage, and the associated memory address is added to the first stage of the pipeline. This technique results in the used reference address being replaced by the associated memory address, thus avoiding multiple similar addresses being present in the pipeline, but nevertheless ensures that the associated memory address is added at the front of the pipeline so that the most recently added reference address will be retained in the pipeline for longer than any less recent reference addresses. When the first reference address register is the selected reference address register, then the addresses within the pipeline are shifted on one stage only if the first reference address value differs from the associated memory address by more than a predetermined amount. This also helps to ensure that the reference address registers do not contain several similar reference address values.

FIG. 12 illustrates a table showing an example of applying the technique of FIGS. 10 and 11 to a pipeline having two reference address registers. In this example, it is assumed that the minimum size of the address portion in the trace data element is 8 bits (i.e. 2 hexadecimal digits—e.g. a value of 0x01 has the minimum address portion size). Therefore, the predetermined threshold used in step 116 of FIG. 11 corresponds to the minimum size of 8 bits. The threshold may be specified either as a threshold portion size of 8 bits, or as a threshold numerical difference of 255 (which is the maximum value representable using 8 bits).

In the first two steps of FIG. 12, the first reference address register (reference address register 0) of the pipeline is the selected reference address register, and the difference between the associated memory address and the selected reference address of the first reference address register in the pipeline is not larger than the predetermined threshold (since the difference 0x01 in step 1 and 0x21 in step 2 can be represented using the minimum portion size). Therefore, in steps 1 and 2 the addresses within the pipeline are not shifted on one stage. Instead, the reference address of address register 0 is overwritten with the associated memory address, following steps 116 and 114 of FIG. 11.

However, at step 3 of FIG. 12, reference address register 0 is the selected reference address register and the difference 0x30000000 between the associated memory address and the value in reference address register 0 is larger than the threshold, and so in this case the values in the pipeline are shifted on one stage according to step 118 of FIG. 11, and the associated memory address is written to reference address register 0.

Then, at steps 4 and 5 of FIG. 12, reference address register 1 is the selected reference address register. In this case, the value stored in reference address register 0 is shifted on to be stored in the reference address register 1 (according to step 112 of FIG. 11), and the associated memory address is written to reference address register 0 (according to step 114 of FIG. 1).

At step 6 of FIG. 12 there is again no shift in the pipeline because the portion of the associated memory address that is different to the corresponding portion of the address value in the first address register is 0x08, which again does not exceed the threshold portion size of 8 bits.

In each step shown in FIG. 12, a trace data element is generated identifying the selected address register and the difference between the associated memory address and the address value in the selected address register. On analysing the trace data, the diagnostic circuit 24 modifies the addresses in the address registers in a corresponding way to the trace circuit 8.

While the examples of FIGS. 9 and 12 show the case where the address difference between the associated address and the selected reference address is indicated by a portion of the associated address having different bit values to a corresponding portion of the reference address, it will be appreciated that this technique can also be applied to the case where the trace data elements indicate the address difference as a numerical difference value obtained by subtracting one of the associated address and the selected reference address from the other.

Figure 13:
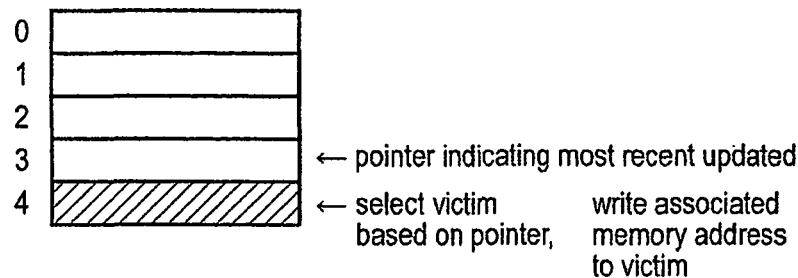
FIG. 13 illustrates another example of updating reference addresses in the reference address registers.

FIG. 13 shows another example of updating the reference addresses in the reference address registers 30. Rather than physically shifting the addresses from one reference address register to another as shown in FIGS. 7 and 10, an associated memory address may be written to a selected victim reference address register, with other reference address registers remaining unchanged. The trace circuit 8 or diagnostic circuit 24 can perform different types of victim selection algorithm to select the victim reference address register, for example, a least recently used, round robin, or random victim selection algorithm.

For example, the address registers 30 may be considered to form a table or cache-like structure. A pointer can be maintained by the trace circuit 8 or diagnostic circuit 24 to indicate the most recently updated register. When selecting a victim register, the trace circuit 8 or diagnostic circuit 24 can select the register following the register currently being indicated with the pointer (if the last register in the table is currently indicated with the pointer, then the trace circuit 8 or diagnostic circuit 24 can select the first register in the table). The trace circuit 8 or diagnostic circuit 24 can then update the selected victim register with the associated memory address, and modify the pointer to indicate the newly selected victim register. By repeating this victim selection algorithm each time an associated memory address is to be written to the reference address registers 30, the trace circuit 8 or diagnostic 24 will update the registers in a cyclic sequence so that the least recently updated address register is the next to be selected as a victim.

The embodiment of FIG. 13 in which the associated memory address is written to a selected victim reference address register may be more efficient than a pipeline embodiment in cases where there are many reference address registers.

Figure 14:
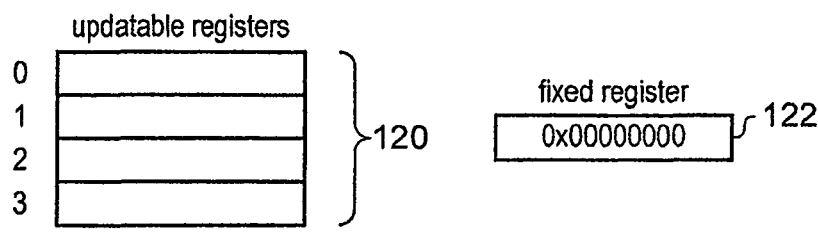
FIG. 14 illustrates the use of a fixed reference address register.

FIG. 14 shows another example in which, as well as a number of updatable reference address registers 120 (which may be part of a pipeline according to FIGS. 7 to 12, or a table or cache-like structure as shown in FIG. 13), there is also at least one fixed reference address register 122 which cannot be updated. The fixed reference address register 122 stores a predefined reference address value. For example, the fixed reference address register can be configured to store an address known to be used frequently within a given program.

Figure 15:
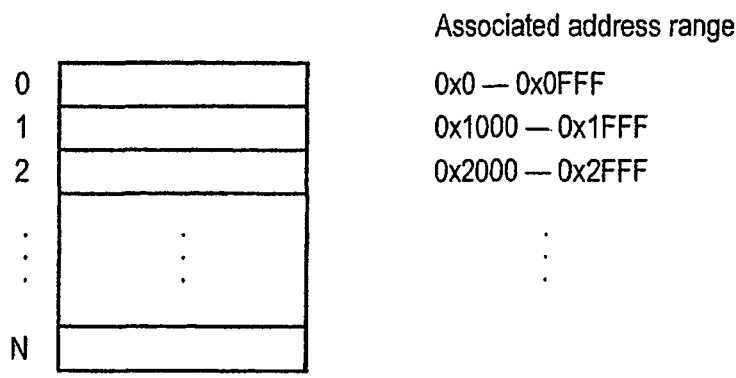
FIG. 15 illustrates an example in which range-specific reference address registers are provided each associated with an associated address range.

FIG. 15 shows another example in which some of the reference address registers are associated with a particular address range so that they can only be updated with associated memory addresses within that address range. If an associated memory address being traced is outside the address range specified for a particular register, then that register is excluded from the register update process. This can be used, for example, to ensure that there is a wide selection of reference addresses associated with different ranges of the memory space.

Figure 16:
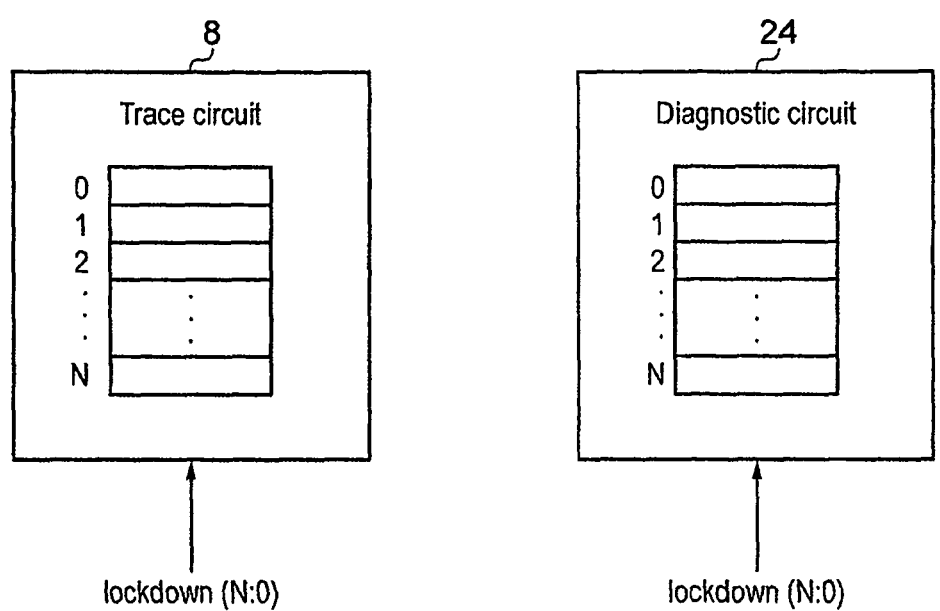
FIG. 16 illustrates a technique for dynamically locking down certain address registers in response to a lockdown signal.

FIG. 16 shows an example in which the trace circuit 8 and diagnostic circuit 24 are responsive to an external lockdown signal for dynamically locking down certain registers so that they can no longer be updated. For example, the locked down register may be excluded from the pipeline as shown in FIGS. 7 to 12 or may be excluded from the victim selection algorithm. Hence, if a particular reference address register 30 is storing a reference address which is known to be useful for a following set of instructions then the lockdown signal could be provided to ensure that the reference address will not be evicted from the reference address registers 30.

To enable the diagnostic circuit 24 to lock its registers 30-2 in a corresponding way to the trace circuit 8, the corresponding lockdown signal may be provided to the diagnostic circuit 24 when analysing the trace data elements. Alternatively, the trace circuit 8 may include in the trace stream information indicating which values of the lockdown signal were used, so that the diagnostic circuit 24 can lock its registers 30-2 in a corresponding way to the registers 30-1 of the trace circuit.

It will be appreciated that the various techniques shown in FIGS. 7 to 16 for updating the reference address registers may be used in combination, for example, there may be a subset of registers provided in a pipeline with at least one other register storing a fixed predetermined value or being associated with a particular range of addresses.

Although illustrative embodiments of the invention have been described in detail herein, with reference to the accompanying drawings, it is to be understood that the invention is not limited to those precise embodiments, and that various changes and modifications can be made by one skilled in the art without departing from the scope of the invention that is defined by the appended claims.

We claim:

1. A data processing apparatus comprising:
   a memory comprising a plurality of memory locations identified by corresponding memory addresses;
   processing circuitry configured to perform processing operations in response to instructions; and
   trace circuitry configured to generate a stream of trace data elements indicative of said processing operations performed by said processing circuitry and to output said stream of trace data elements; wherein:
   said trace circuitry comprises a plurality of reference address registers configured to store a plurality of reference addresses; and
   said trace circuitry is responsive to said processing circuitry processing an instruction for performing a processing operation associated with an associated memory address to select one of said plurality of reference address registers as a selected reference address register and to generate and output a trace data element indicating:
   (i) first information indicative of which of said plurality of reference address registers is said selected reference address register; and
   (ii) second information indicative of a difference between said associated memory address and a selected reference address stored in said selected reference address register;
   wherein said trace circuitry is configured, after generating said trace data element, to perform a reference address updating operation for selectively updating the reference address of at least one of said plurality of reference address registers in dependence on said associated memory address, and
   wherein said reference address updating operation comprises writing said associated memory address to a victim reference address register of said plurality of reference address registers.

2. The data processing apparatus according to claim 1, wherein said trace data element comprises a header portion indicating said first information and an address portion indicating said second information.

3. The data processing apparatus according to claim 2, wherein if said difference between said associated memory address and said selected reference address is zero, then said trace circuitry omits said address portion from said trace data element.

4. The data processing apparatus according to claim 1, wherein said trace circuitry is configured to determine a plurality of candidate second information values corresponding to said plurality of reference address registers, each candidate second information value indicative of a difference between said associated memory address and the reference address stored in the corresponding reference address register; and
said trace circuitry is configured to select as said selected reference address register one of said reference address registers corresponding to a most efficient candidate second information value, and to generate said trace data element with said second information corresponding to said most efficient candidate second information value.

5. The data processing apparatus according to claim 4, wherein said most efficient candidate second information value is the candidate second information value for which the corresponding second information is representable using the smallest number of bits.

6. The data processing apparatus according to claim 4, wherein said most efficient candidate second information value is the candidate second information value for which the corresponding second information, if included in said trace data element within said stream of trace data elements, would result in the smallest total amount of trace data within said stream of trace data elements.

7. The data processing apparatus according to claim 1, wherein said second information indicates a portion of said associated memory address having different bit values to a corresponding portion of said selected reference address of said selected reference address register.

8. The data processing apparatus according to claim 1, wherein said second information indicates a numerical difference between said associated memory address and said selected reference address.

9. The data processing apparatus according to claim 1, wherein said reference address updating operation comprises:
(a) determining for at least one reference address register whether or not an address difference between the corresponding reference address and said associated memory address exceeds a predetermined threshold; and
(b) if said address difference exceeds said predetermined threshold for each of said at least one reference address register, then writing said associated memory address to a victim reference address register selected from said at least one reference address register.

10. The data processing apparatus according to claim 9, wherein said trace data element comprises an address portion indicating said second information, and said predetermined threshold corresponds to a minimum size of said address portion.

11. The data processing apparatus according to claim 1, wherein said trace circuitry is configured to perform a victim selection operation to select which of said plurality of reference address registers is said victim reference address register.

12. The data processing apparatus according to claim 1, wherein said trace circuitry is responsive to a lockdown signal to selectively exclude at least one reference address register from being updated by said reference address updating operation.

13. The data processing apparatus according to claim 1, wherein at least one of said plurality of reference address registers is a fixed reference address register for storing a predefined reference address, said fixed reference address register being excluded from being updated by said reference address updating operation.

14. The data processing apparatus according to claim 1, wherein at least one of said plurality of reference address registers is a range-specific reference address register associated with an associated range of said memory addresses, said range-specific reference address register being excluded from being updated by said reference address updating operation if said associated memory address is outside said associated range of said memory addresses.

15. The data processing apparatus according to claim 1, wherein at least a subset of said plurality of reference address registers are coupled to form a reference address pipeline, and said reference address updating operation comprises updating the reference addresses in said reference address pipeline in dependence on said associated memory address.

16. The data processing apparatus according to claim 1, wherein said reference address pipeline comprises N reference address registers; and
said reference address updating operation comprises shifting reference addresses within the first to $(N-1)^{th}$ reference address registers of said reference address pipeline to a next reference address register of said reference address pipeline, and writing said associated memory address to a first reference address register of said reference address pipeline.

17. The data processing apparatus according to claim 15, wherein said reference address pipeline comprises N reference address registers, said selected reference address register comprises an $M^{th}$ reference address register of said reference address pipeline, where $1 \leq M \leq N$, and said reference address updating operation comprises:
if $M>1$, then shifting reference addresses within the first to $(M-1)^{th}$ reference address registers of said reference address pipeline to a next reference address register of said reference address pipeline; and
writing said associated memory address to a first reference address register of said reference address pipeline.

18. The data processing apparatus according to claim 17, wherein if $M=1$, then said pipeline updating operation further comprises:
determining whether a difference between said associated memory address and the reference address of said first reference address register exceeds a predetermined threshold; and
if said difference exceeds said predetermined threshold, shifting reference addresses within the first to $(N-1)^{th}$ reference address registers of said reference address pipeline to a next reference address register of said reference address pipeline before writing said associated memory address to said first reference address register of said reference address pipeline.

19. The data processing apparatus according to claim 17, wherein said trace circuitry is configured to determine N candidate second information values corresponding to said N reference address registers, each candidate second information value indicative of a difference between said associated memory address and the reference address stored in the corresponding reference address register;

said trace circuitry is configured to select as said selected reference address register one of said N reference address registers corresponding to a most efficient candidate second information value; and if there are multiple reference address registers for which the corresponding candidate second information values are equally efficient, said trace circuitry selects as said selected reference address register one of said multiple reference address registers that is closest to the end of said reference address pipeline.

20. The data processing apparatus according to claim 1, wherein said trace circuitry is responsive to an initialisation event to store a default reference address to each of said plurality of reference address registers.

21. The data processing apparatus according to claim 20, wherein said initialisation event is said trace circuitry being activated.

22. The data processing apparatus according to claim 20, wherein said initialisation event is a trace synchronisation event for triggering said trace circuitry to generate and output a trace synchronisation data element.

23. The data processing apparatus according to claim 1, wherein said processing circuitry is configured to perform data processing operations in response to a plurality of different types of data processing instruction; and for each of said plurality of types of data processing instruction, said trace circuitry is configured to select any of said plurality of reference address registers as said selected address register, such that said trace circuitry uses a same reference address register for generating trace data elements indicative of different types of data processing instruction.

24. The data processing apparatus according to claim 23, wherein said plurality of types of data processing instruction include at least two of:
a branch instruction;
an instruction being executed when an exception event occurs;
an instruction to which execution is directed after said exception event has occurred;
an instruction currently being executed by said processing circuitry;
a load instruction; and
a store instruction.

25. A data processing apparatus comprising:
memory means for storing data, said memory means comprising a plurality of memory locations identified by corresponding memory addresses;
processing means for performing processing operations in response to instructions; and
trace means for generating a stream of trace data elements indicative of said processing operations performed by said processing means and for outputting said stream of trace data elements; wherein:
said trace means comprises a plurality of reference address register means for storing a plurality of reference addresses; and
said trace means is responsive to said processing means processing an instruction for performing a processing operation associated with an associated memory address to select one of said plurality of reference address register means as a selected reference address register means and to generate and output a trace data element indicating:
(i) first information indicative of which of said plurality of reference address register means is said selected reference address register means; and (ii) second information indicative of a difference between said associated memory address and a selected reference address stored in said selected reference address register means; and wherein said trace means is configured, after generating said trace data element, to perform a reference address updating operation for selectively updating the reference address of at least one of said plurality of reference address register means in dependence on said associated memory address, and wherein said reference address updating operation comprises writing said associated memo address to a victim reference address register means of said plurality of reference address registers.

26. A data processing method for a data processing apparatus comprising a memory comprising a plurality of memory locations identified by corresponding memory addresses, said method comprising the steps of:
performing processing operations in response to instructions;
storing a plurality of reference addresses in a plurality of reference address registers;
generating a stream of trace data elements indicative of said processing operations performed by said processing circuitry; and
outputting said stream of trace data elements; wherein:
said step of generating a stream of trace data elements comprises, in response to performance of a processing operation associated with an associated memory address, selecting one of said plurality of reference address registers as a selected reference address register and generating and outputting a trace data element indicating:

(i) first information indicative of which of said plurality of reference address registers is said selected reference address register; and (ii) second information indicative of a difference between said associated memory address and a selected reference address stored in said selected reference address register; and after generating said trace data element, performing a reference address updating operation for selectively updating the reference address of at least one of said plurality of reference address registers in dependence on said associated memory address, and wherein said reference address updating operation comprises writing said associated memory address to a victim reference address register of said plurality of reference address registers.

27. A trace unit for monitoring processing operations performed by a processing apparatus in response to instructions, said processing apparatus comprising a memory comprising a plurality of memory locations identified by corresponding memory addresses; said trace unit comprising:
trace circuitry configured to generate a stream of trace data elements indicative of said processing operations performed by said processing apparatus and to output said stream of trace data elements; wherein:
said trace circuitry comprises a plurality of reference address registers configured to store a plurality of reference addresses; and
said trace circuitry is responsive to said processing apparatus processing an instruction for performing a processing operation associated with an associated memory address to select one of said plurality of reference address registers as a selected reference address register and to generate and output a trace data element indicating:

(i) first information indicative of which of said plurality of reference address registers is said selected reference address register; and
(ii) second information indicative of a difference between said associated memory address and a selected reference address stored in said selected reference address register; and
   wherein said trace circuitry is configured, after generating said trace data element, to perform a reference address updating operation for selectively updating the reference address of at least one of said plurality of reference address registers in dependence on said associated memory address, and
   wherein said reference address updating operation comprises writing said associated memo address to a victim reference address register of said plurality of reference address registers.

28. A trace unit for monitoring processing operations performed by a processing apparatus in response to instructions, said processing apparatus comprising a memory means for storing data, said memory means comprising a plurality of memory locations identified by corresponding memory addresses; said trace unit comprising:
   trace means for generating a stream of trace data elements indicative of said processing operations performed by said processing apparatus and for outputting said stream of trace data elements; wherein:
   said trace means comprises a plurality of reference address register means for storing a plurality of reference addresses; and
   said trace means is responsive to said processing apparatus processing an instruction for performing a processing operation associated with an associated memory address to select one of said plurality of reference address register means as a selected reference address register means and to generate and output a trace data element indicating:
(i) first information indicative of which of said plurality of reference address register means is said selected reference address register means; and
(ii) second information indicative of a difference between said associated memory address and a selected reference address stored in said selected reference address register means; said
   wherein said trace means is configured, after generating said trace data element, to perform a reference address updating operation for selectively updating the reference address of at least one of said plurality of reference address register means in dependence on said associated memory address, and
   wherein said reference address updating operation comprises writing said associated memory address to a victim reference address register means of said plurality of reference address registers.

29. A diagnostic apparatus for analysing a stream of trace data elements indicative of processing operations performed by a processing apparatus in response to instructions, said processing apparatus comprising a memory comprising a plurality of memory locations identified by corresponding memory addresses, said diagnostic apparatus comprising:
   a trace input for receiving said stream of trace data elements; and
   diagnostic circuitry configured to analyse said stream of trace data elements to determine a processing outcome of said processing operations; wherein:
   said diagnostic circuitry comprises a plurality of reference address registers configured to store a plurality of reference addresses; and said diagnostic circuitry is responsive to an indication of said processing apparatus processing an instruction for performing a processing operation associated with an associated memory address to:
(a) locate in said stream of trace data elements a trace data element indicating (i) first information indicative of which of said plurality of reference address registers is a selected reference address register; and (ii) second information indicative of a difference between said associated memory address and a selected reference address stored in said selected reference address register; and
(b) determine said associated memory address in dependence on said second information and said selected reference address stored in said selected reference address register;
   wherein said diagnostic circuitry is configured, after determining said associated memory address, to perform a reference address updating operation for selectively updating the reference address of one of said plurality of reference address registers in dependence on said associated memory address; and
   wherein said reference address updating operation comprises writing said associated memory address to a victim reference address register of said plurality of reference address registers.

30. The diagnostic apparatus according to claim 29, wherein said trace data element comprises a header portion indicating said first information and an address portion indicating said second information.

31. The diagnostic apparatus according to claim 30, wherein if said trace data element does not include said address portion, then said diagnostic circuitry determines said associated memory address to be the same as said selected reference address.

32. The diagnostic apparatus according to claim 29, wherein said second information indicates a portion of said associated memory address having different bit values to a corresponding portion of said selected reference address of said selected reference address register; and
   said diagnostic circuitry is configured to determine said associated memory address as having an address value that is equivalent to a value obtained by: (i) starting with the bit values of said selected reference address, and (ii) replacing bit values of said corresponding portion of said selected reference address with bit values of said portion of said associated memory address indicated by said second information.

33. The diagnostic apparatus according to claim 29, wherein said second information indicates a numerical difference between said associated memory address and said selected reference address; and
   said diagnostic circuitry is configured to determine said associated memory address by adding said numerical difference indicated by said second information to said selected reference address.

34. The diagnostic apparatus according to claim 29, wherein said reference address updating operation comprises:
(a) determining for at least one reference address register whether or not an address difference between the corresponding reference address and said associated memory address exceeds a predetermined threshold; and
(b) if said address difference exceeds said predetermined threshold for each of said at least one reference address register, then writing said associated memory address to a victim reference address register selected from said at least one reference address register.

35. The diagnostic apparatus according to claim 34, wherein said trace data element comprises an address portion indicating said second information, and said predetermined threshold corresponds to a minimum size of said address portion.

36. The diagnostic apparatus according to claim 29, wherein said diagnostic circuitry is configured to perform a victim selection operation to select which of said plurality of reference address registers is said victim reference address register.

37. The diagnostic apparatus according to claim 29, wherein said diagnostic circuitry is responsive to a lockdown signal to selectively exclude at least one reference address register from being updated by said reference address updating operation.

38. The diagnostic apparatus according to claim 29, wherein at least one of said plurality of reference address registers is a fixed reference address register for storing a predefined reference address, said fixed reference address register being excluded from being updated by said reference address updating operation.

39. The diagnostic apparatus according to claim 29, wherein at least one of said plurality of reference address registers is a range-specific reference address register associated with an associated range of said memory addresses, said range-specific reference address register being excluded from being updated by said reference address updating operation if said associated memory address is outside said associated range of said memory addresses.

40. The diagnostic apparatus according to claim 29, wherein at least a subset of said plurality of reference address registers are coupled to form a reference address pipeline, and said reference address updating operation comprises updating the reference addresses in said reference address pipeline in dependence on said associated memory address.

41. The diagnostic apparatus according to claim 40, wherein said reference address pipeline comprises N reference address registers; and
said reference address updating operation comprises shifting reference addresses within the first to $(N-1)^{th}$ reference address registers of said reference address pipeline to a next reference address register of said reference address pipeline, and storing said associated memory address to a first reference address register of said reference address pipeline.

42. The diagnostic apparatus according to claim 40, wherein said reference address pipeline comprises N reference address registers, said selected reference address register comprises an $M^{th}$ reference address register of said reference address pipeline, where 1≤M≤N, and said reference address updating operation comprises:
if M>1, then shifting reference addresses within the first to $(M-1)^{th}$ reference address registers of said reference address pipeline to a next reference address register of said reference address pipeline; and
storing said associated memory address to a first reference address register of said reference address pipeline.

43. The diagnostic apparatus according to claim 42, wherein if M=1, then said reference address updating operation further comprises:
determining whether a difference between said associated memory address and the reference address of said first reference address register exceeds a predetermined threshold; and
if said difference exceeds said predetermined threshold, shifting reference addresses within the first to $(N-1)^{th}$ reference address registers of said reference address pipeline to a next reference address register of said reference address pipeline before writing said associated memory address to said first reference address register of said reference address pipeline.

44. The diagnostic apparatus according to claim 29, wherein said diagnostic circuitry is responsive to an initialisation event to store a default reference address to each of said plurality of reference address registers.

45. The diagnostic apparatus according to claim 44, wherein said initialisation event is said diagnostic circuitry being activated.

46. The diagnostic apparatus according to claim 44, wherein said initialisation event is said diagnostic circuitry being responsive to a trace synchronisation data element in said stream of trace data elements.

47. A diagnostic apparatus for analysing a stream of trace data elements indicative of processing operations performed by a processing apparatus in response to instructions, said processing apparatus comprising memory means for storing data, said memory means comprising a plurality of memory locations identified by corresponding memory addresses, said diagnostic apparatus comprising:
trace input means for receiving said stream of trace data elements; and
diagnostic means for analysing said stream of trace data elements to determine a processing outcome of said processing operations; wherein:
said diagnostic means comprises a plurality of reference address register means for storing a plurality of reference addresses; and
said diagnostic means is responsive to an indication of said processing apparatus processing an instruction for performing a processing operation associated with an associated memory address to:
(a) locate in said stream of trace data elements a trace data element indicating (i) first information indicative of which of said plurality of reference address register means is a selected reference address register means; and (ii) second information indicative of a difference between said associated memory address and a selected reference address stored in said selected reference address register means; and
(b) determine said associated memory address in dependence on said second information and said selected reference address stored in said selected reference address register means;
wherein said diagnostic means is configured, after determining said associated memory address, to perform a reference address updating operation for selectively updating the reference address of one of said plurality of reference address register means in dependence on said associated memory address; and
wherein said reference address updating operation comprises writing said associated memory address to a victim reference address register means of said plurality of reference address registers.

48. A method for analysing a stream of trace data elements indicative of processing operations performed by a processing apparatus in response to instructions, said processing apparatus comprising a memory comprising a plurality of memory locations identified by corresponding memory addresses, said method comprising the steps of:
receiving said stream of trace data elements;
storing a plurality of reference addresses in a plurality of reference address registers; and
analysing said stream of trace data elements to determine a processing outcome of said processing operations; wherein:

said step of analysing comprises, in response to an indication of said processing apparatus processing an instruction for performing a processing operation associated with an associated memory address:

(a) locating in said stream of trace data elements a trace data element indicating (i) first information indicative of which of said plurality of reference address registers is a selected reference address register; and (ii) second information indicative of a difference between said associated memory address and a selected reference address stored in said selected reference address register; and (b) determining said associated memory address in dependence on said second information and said selected reference address stored in said selected reference address register; and after determining said associated memory address, performing a reference address updating operation for selectively updating the reference address of one of said plurality of reference address registers in dependence on said associated memory address; and wherein said reference address updating operation comprises writing said associated memory address to a victim reference address register of said plurality of reference address registers.

\* \* \* \* \*